Patented July 16, 1940

2,207,702

UNITED STATES PATENT OFFICE 2,207,702

ORGANIC SOLVENT SOLUBLE CELLULOSIC FILM PLASTICIZED WITH GLYCOL DI-GLYCOLATE

William D. R. Straughn, Kenmore, N. Y., assignor to E. I. du Pont de Nemours & Company, Wilmington, Del., a corporation of Delaware No Drawing. Application September 1, 1939, Serial No. 293,052

8 Claims. (Cl. 106—40)

This invention relates to plasticized organic derivatives of cellulose, especially sheet material and the like. More particularly, it appertains to compositions of matter comprising essentially cellulose acetate plasticized with glycol diglycolate, the same being eminently suited for the manufacture of thin film such as sheet wrapping material.

Organic derivatives of cellulose, such as organic solvent soluble cellulose acetate, are not compatible with many of the plasticizers heretofore known and used in nitrocellulose compositions. In fact, up to the present time relatively few compounds have been found to have the desired compatibility necessary to enable them to combine with these cellulosic materials to produce strong and flexible film of the thinness desirable for a sheet wrapping material. Furthermore, many of the compounds which do satisfactorily produce flexibility and toughness adversely affect other properties of the film, such as transparency, and are, therefore, unsatisfactory. In addition, some of the compounds effecting favorable characteristics in freshly prepared film have only a temporary effect, and as a result, the plasticized material upon standing gradually loses its flexibility and becomes brittle.

This invention had for an object the production of new compositions of matter suitable for the manufacture of permanently transparent, strong and flexible sheets or films, and the sheet material produced therefrom. A further object was to dry cast acetone soluble cellulose acetate into thin, strong, flexible sheets capable of retaining their physical and chemical characteristics. A general advance in the art, and other objects which will appear hereinafter, are also contemplated.

In the following description, general and specific, are disclosed certain embodiments of the invention and details of what is believed to be the best mode for carrying out the invention.

It has now been found that cellulose acetate and like organic derivatives of cellulose, when combined with glycol di-glycolate, having the formula:

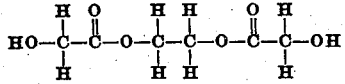

are capable of easy and convenient manipulation in the plastic arts, being particularly well suited for the manufacture of transparent, strong, flexible sheets, films, ribbons, filaments, and the like.

In a preferred embodiment of the invention, cellulose acetate containing 56% combined acetic acid (22.5 parts), glycol di-glycolate (7.5 parts), and acetone (70.0 parts) were mixed together to form a solution. After being filtered and rested for a suitable period of time (usually 3 or 4 days to enable air bubbles to work out of the solution) in accordance with dry casting practice, it was dry cast upon a smooth nickel casting wheel (any other suitable film-forming surface may be employed) to produce a film in a manner well known to those skilled in the art. The film so produced was transparent, strong and flexible.

This invention is applicable to all kinds of organic derivatives of cellulose which are soluble in organic liquids (solvents), including cellulose esters such as cellulose acetate, cellulose propionate, cellulose butyrate, and the like; mixed esters, such as cellulose aceto-propionate, cellulose aceto-butyrate and the like; cellulose ethers, such as methyl cellulose, ethyl cellulose, benzyl cellulose and the like; mixed ethers, such as ethyl-benzyl cellulose and the like; and mixed cellulose ether esters such as ethyl cellulose acetate, and the like.

Any suitable solvent for the composition may be used to facilitate the manufacture of shaped products. The casting solvent employed depends upon the particular cellulosic material being cast. The selection of a single compound or mixture of compounds from the well known list of organic liquids which includes methyl acetate, benzene, dioxane, ethylene dichloride, methylene dichloride, ethanol, propanol, ethyl formate and the like, can easily be made empirically.

Acetone is very satisfactorily employed in the dry casting of thin cellulose acetate film from acetone soluble cellulose acetate. Other very suitable solvents for 50%–56% combined acetic acid cellulose acetate include:

Ethylene dichloride-methanol_____ 90:10
Methylene dichloride-methanol_____ 90:10
Methylene dichloride-ethanol_____ 90:10
Methylene dichloride-isopropanol_____ 90:10
Methyl acetate and
Ethyl formate.

In practice the glycol di-glycolate is incorporated in the cellulose acetate and like material to the extent of from about 10% to 40% (based on the weight of the solid product formed). Preferably the formed product contains about 10% to 25% of the plasticizer. Glycol di-glycolate is especially useful for softening and/or plasticizing acetone-soluble cellulose acetate such as that containing from 51%–56% (or more broadly, 46%–56%) combined acetic acid.

The glycol di-glycolate may be used in the cellulose derivative composition alone or in combination with other known plasticizers, such as, for example, ethylene glycol mono-methyl ether adipate, ethylene glycol mono-methyl ether phthalate, ethylene glycol mono-ethyl ether phthalate, ethylene glycol mono-butyl ether phthalate, triethylene glycol, tetra-ethylene glycol, diethylene glycol isobutyrate, di-ethylene glycol di-propionate, tri-ethylene glycol hexoate, octyl glycolate, dimethoxy tetraethylene glycol, and the like. The adjuvant plasticizer material may comprise one or more than one of these substances.

The composition, although comprising essentially cellulosic material (the organic derivative of the cellulose) and plasticizing material, may, if desired, contain in addition natural or synthetic resins, waxes, dyes, blending agents, and the like, or even pigments or other opaquing agents.

Although this invention has been described primarily from the standpoint of the manufacture of sheeting or film for use as sheet wrapping material, these compositions may be used for the manufacture of photographic film, plastics, lacquers, artificial straw, fine filaments and yarns thereof suitable for textile uses, and other products.

As many apparently widely different embodiments of this invention may be made without departing from the spirit and scope thereof, it is to be understood that this invention is not limited to the specific embodiments thereof except as defined in the appended claims.

I claim:

1. A composition of matter consisting of organic solvent soluble cellulose acetate plasticized with 10% to 40% (based on the weight of the combination) of glycol di-glycolate.

2. Sheet wrapping material consisting essentially of cellulose acetate plasticized with glycol di-glycolate.

3. A composition of matter consisting essentially of cellulose acetate plasticized with one-third its weight of glycol di-glycolate.

4. A third film comprising essentially cellulose acetate of about 56% combined acetic acid content and 10% to 40% (based on the weight of the product) of glycol di-glycolate.

5. Sheet wrapping material comprising essentially cellulosic material which is organic solvent soluble and which is from the group consisting of cellulose organic acid esters and cellulose ethers plasticized with glycol di-glycolate.

6. Sheet wrapping material consisting essentially of organic solvent soluble ethyl cellulose plasticized with glycol di-glycolate.

7. A composition of matter consisting of organic solvent soluble cellulose acetate plasticized with 10% to 25% (based on the weight of the combination) of glycol di-glycolate.

8. A composition of matter consisting of organic solvent soluble ethyl cellulose plasticized with 10% to 25% (based on the weight of the combination) of glycol di-glycolate.

WILLIAM D. R. STRAUGHN.